Figure 1:
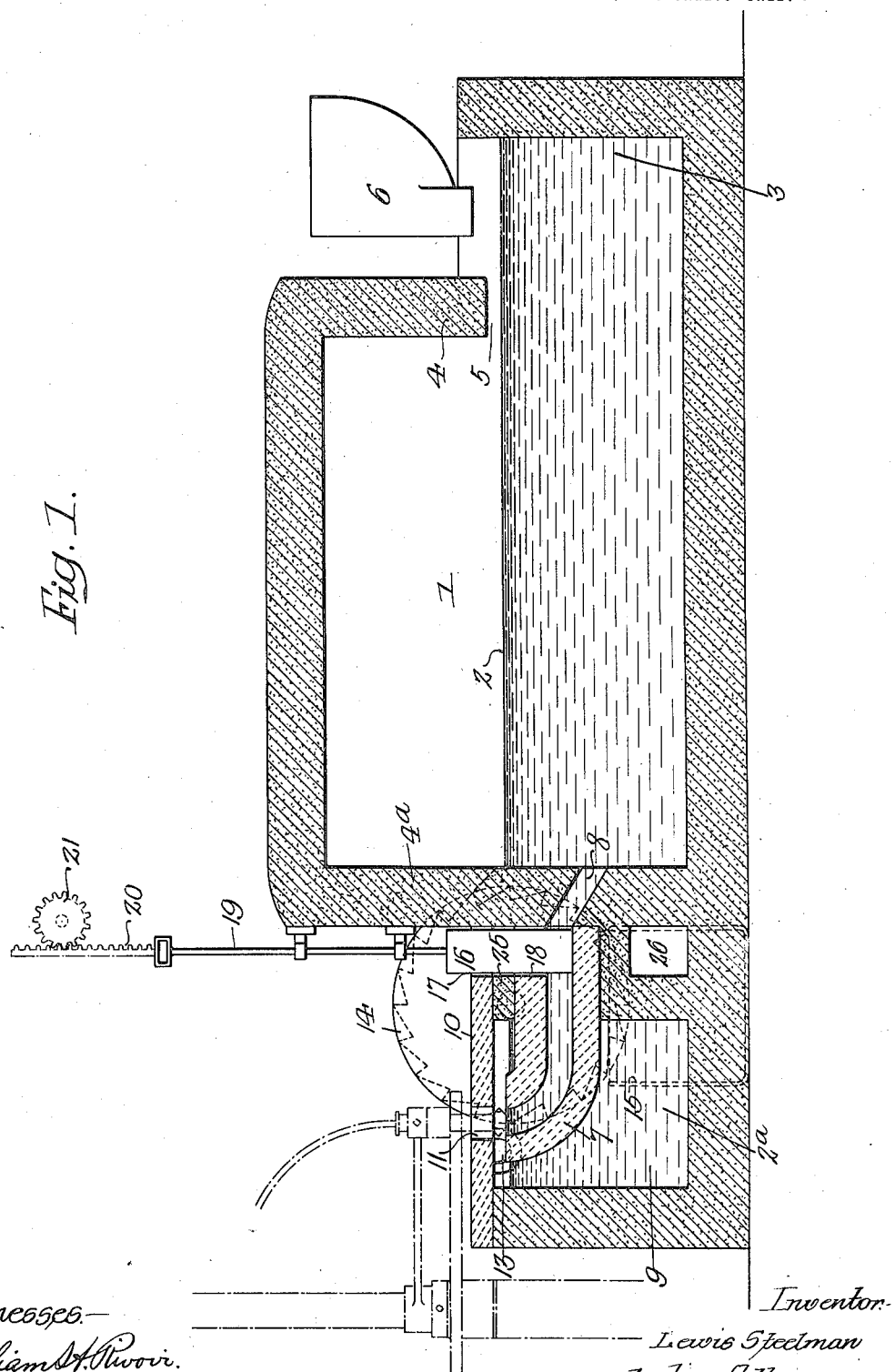

L. STEELMAN.
GLASS FURNACE.
APPLICATION FILED MAR. 30, 1912.

1,145,815.

Patented July 6, 1915.
2 SHEETS—SHEET 1.

Witnesses—
William H. Rivoir.
Will A. Barrows.

Inventor—
Lewis Steelman
by his Attorneys—
Howson & Howson

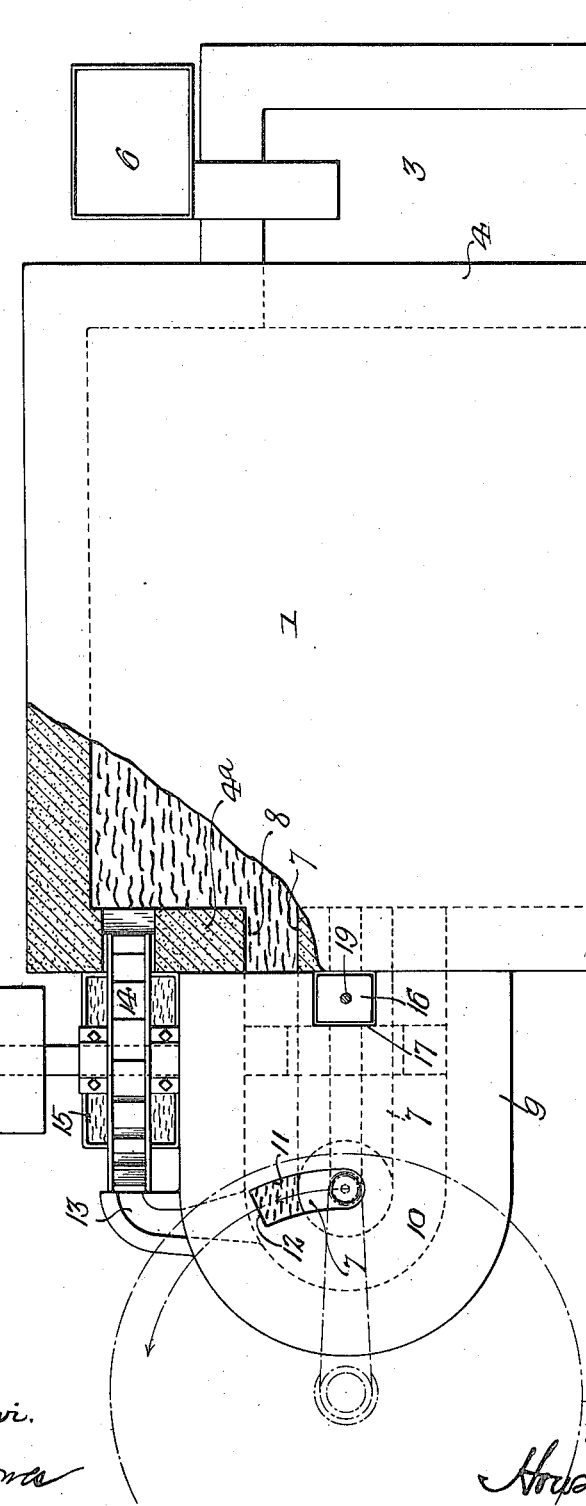

UNITED STATES PATENT OFFICE.

LEWIS STEELMAN, OF MILLVILLE, NEW JERSEY.

GLASS-FURNACE.

1,145,815.          Specification of Letters Patent.          Patented July 6, 1915.

Application filed March 30, 1912. Serial No. 687,376.

*To all whom it may concern:*

Be it known that I, LEWIS STEELMAN, a citizen of the United States, and a resident of Millville, New Jersey, have invented certain Improvements in Glass-Furnaces, of which the following is a specification.

My invention relates to glass furnaces; and the object of my invention is to provide an improved form of structure in which provision is made for the feeding of a constant supply of fresh, clean, fully molten glass to a gathering point, or to a plurality of gathering points, as may be desired. In the present instance, my improved structure is shown, as organized for the delivery of glass to a single gathering point. These and other features of my invention are more fully set forth in the accompanying drawings, in which:

Figure 1, is a sectional elevation of a structure having and containing the improvements forming the subject of my invention, and Fig. 2 is a plan view of the same, partly in section.

The furnace proper may be of ordinary construction, common in the art to which my invention relates. It may be provided with a dog-house in proper communication therewith into which the fresh batches of glass-forming material may be fed for passage to the molten mass below the surface of the same.

In the drawings, the furnace is illustrated at 1; the glass being shown at 2, and the glass-receiving dog-house at 3; while a wall 4, between the dog-house and the furnace, is apertured at 5 so that material fed to such dog-house from a hopper 6 for instance, will melt and flow into the main body of the furnace. By preference, sufficient material is constantly fed thereto to keep the molten glass within the furnace at a predetermined and desired level.

At the operative end of the furnace I provide an outlet or spout 7 which communicates with the furnace by means of an opening 8 in the front wall 4ª of said furnace; the operative end of said spout being disposed substantially at the same height as the height of glass within the furnace, and such spout is disposed at a convenient point for coöperation with a gathering device of a suitable character, shown by dotted lines, which may be mounted outside the furnace and swing in the arc of a circle over such outlet. This spout is disposed in a supplemental chamber 9, which may be in communication with the furnace and which gradually fills with glass; such glass representing the excess from gathering operations. This body of glass, indicated at 2ª, is preferably maintained at a level slightly lower than that of the main body of glass. The supplemental chamber is provided with a top wall or cover 10, having an elongated aperture 11, directly over the spout 7, and preferably curved in the arc of a circle coincident with the rotary path of the gathering device. The excess of gathered glass, raised by any suitable means from said outlet 7 into the gathering device of whatever character the latter may be, is cut off by engagement with a suitable shearing edge 12 formed at the end of the opening or aperture 11 in the top wall 10 adjacent said outlet, and the surplus glass so removed passes to the body of glass 2ª within the supplemental chamber surrounding the spout, which body of glass by reason of the constant additions thereto from the operations of the gathering device, overflows at a suitable point at the side of the furnace and discharges through a spout 13. From there it is carried by suitable means and discharged into the main body of glass 2 within the furnace. The operation of the gathering device and the movement of the same away from the spout 7 tends to set up a slight current in the glass fed through such spout, thereby keeping the exposed portion of the same fresh, clean, fully molten and free from all stringy conditions.

The overflow of glass from chamber 9 passes to the spout 13 and discharges directly into a conveyer wheel 14 which is preferably constructed and arranged to lift the discharging glass from said spout, and if necessary actually cut off the same. To keep the wheel 14 in a cool, workable condition, the lower portion of the same runs in water; a suitable receptacle 15, being provided for the purpose.

To cut off the flow of the glass from the main furnace to the spout 7 at any time, I provide a suitable valve 16 of fire-brick which may be lowered through an opening 17 in the top wall or cover 10 and into a recess 18 formed in the spout and lie across the passage 8 leading from the furnace to said spout. This valve may be manually operated, a suitably guided handle 19 being provided, or, if desired, suitable mechanical means may be furnished to raise and lower the same by equipping the handle-bar with a rack 20 operated by a gear 21, as shown by dotted lines.

The spout 7 extends through a supplemental wall 25, and between the latter and the wall 4ª of the furnace and below said spout, a cross passage 26 for the circulation of air may be provided. The main body of glass 2 and the body of glass 2ª in the supplemental chamber may be kept in a molten or plastic state by the application of any suitable form of heating means commonly in use at the present day, disposed at any convenient point.

From the foregoing it will be seen that a constant supply of fresh, clean, fully molten glass, is present at the delivery end of the spout, ready for gathering operations, and that all excess of glass sheared from the gathering device is carried away from the delivery end of said spout 7 and subsequently delivered to the main body of glass within the furnace.

I claim:

1. The combination, in a glass furnace, of a main tank, a supplemental tank exterior of the main tank, a spout leading from the main tank and disposed within the glass in the supplemental tank, said spout extending to the level of the main body of glass and affording a gathering point, said supplemental tank being arranged to overflow, and means for restoring the overflow to the main tank.

2. The combination, in a glass furnace, of a main tank, a supplemental tank exterior of the main tank, a spout leading from the main tank and disposed within the glass in the supplemental tank, said spout extending to the level of the main body of glass and affording a gathering point, said supplemental tank being arranged to overflow, means for restoring the overflow to the main tank, and a cover for said supplemental tank having an opening registering with said spout.

3. The combination, in a glass furnace, of a main tank, a spout leading from the main tank, an inlet from the main tank to said spout below the level of glass therein, said spout extending to the level of the main body of glass and affording a gathering point, an overflow chamber exterior of the main tank, said overflow chamber surrounding said spout and receiving the surplus glass lifted during the gathering operations, and means exterior of the main tank and the overflow chamber for carrying said surplus glass from the overflow chamber to the main body of glass.

4. The combination, in a glass furnace, of a main tank, a supplemental tank, a spout leading from the main tank and disposed within the supplemental tank, an inlet from the main tank to said spout below the level of glass therein, said spout extending to the level of the main body of glass and affording a gathering point, an overflow chamber surrounding said spout and receiving the surplus glass lifted during the gathering operation, a discharge spout carried by said overflow chamber, and means exterior of the main tank and the overflow chamber and coöperating with said spout for returning the surplus glass to the furnace.

5. The combination, in a glass furnace, of a main tank, a supplemental tank, a spout leading from the main tank and disposed within the supplemental tank, an inlet from the main tank to said spout below the level of glass therein, said spout extending to the level of the main body of glass and affording a gathering point, an overflow chamber surrounding said spout and receiving the surplus glass lifted during the gathering operation, a discharge spout carried by said overflow chamber, and a pocketed conveyer wheel coöperating with said spout for returning the surplus glass to the furnace.

In testimony whereof, I have signed my name to this specification, in the presence of two subscribing witnesses.

LEWIS STEELMAN.

Witnesses:
MURRAY C. BOYER,
WM. A. BARR.